(12) United States Patent
Fisher (10) Patent No.: US 10,075,005 B2
(45) Date of Patent: Sep. 11, 2018

(54) PORTABLE ELECTRIC VEHICLE BATTERY DISCHARGER WITH PHYSICALLY REMOVABLE POWER DISCHARGE MODULES

(71) Applicant: Honda Motor Co., Ltd., Tokyo (JP)

(72) Inventor: Robert W. Fisher, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1089 days.

(21) Appl. No.: 13/664,752

(22) Filed: Oct. 31, 2012

(65) Prior Publication Data
US 2014/0117942 A1 May 1, 2014

(51) Int. Cl.
*H01M 10/44* (2006.01)
*H02J 7/00* (2006.01)

(52) U.S. Cl.
CPC ................ *H02J 7/0065* (2013.01)

(58) Field of Classification Search
CPC ....... H02J 2007/0031; H02J 2007/0063; H02J 2007/0065; H02J 2007/0067; H02J 7/0065; Y02T 10/7005; H01M 10/44
USPC ......................................................... 320/136
See application file for complete search history.

(56) References Cited

U.S. PATENT DOCUMENTS

| | | | | |
|---|---|---|---|---|
| 3,553,338 A * | 1/1971 | Holman | ................... | H03G 5/04 84/701 |
| 4,307,688 A * | 12/1981 | Steele | ................... | F02P 19/022 123/179.21 |
| 5,164,653 A * | 11/1992 | Reem | .................... | H02J 7/0063 320/135 |
| 5,856,740 A * | 1/1999 | Rau | ......................... | G05F 1/613 323/223 |
| 5,998,973 A * | 12/1999 | Tsai | ...................... | H01M 10/44 320/135 |
| 6,313,609 B1 | 11/2001 | Brink | | |
| 6,624,613 B2 | 9/2003 | Kitagawa | | |
| 6,727,708 B1 * | 4/2004 | Dougherty | ............. | G01R 31/36 320/132 |
| 7,288,337 B2 * | 10/2007 | Kim | ..................... | H01M 10/46 320/128 |
| 7,586,289 B2 | 9/2009 | Andruk et al. | | |
| 7,592,776 B2 | 9/2009 | Tsukamoto et al. | | |
| 7,688,075 B2 * | 3/2010 | Kelley | ............... | G01R 31/3679 320/132 |
| 7,710,072 B2 * | 5/2010 | Ibrahim | ................ | H02J 7/0063 320/127 |

(Continued)

FOREIGN PATENT DOCUMENTS

JP 08205304 9/1996

OTHER PUBLICATIONS

Pete Hoffman, parallel circuits, 2002-2006, Jennifer Fonder https://www.swtc.edu/ag_power/electrical/lecture/parallel_circuits.htm.*

(Continued)

*Primary Examiner* — Drew A Dunn
*Assistant Examiner* — Jerry D Robbins
(74) *Attorney, Agent, or Firm* — Arent Fox LLP (57) ABSTRACT

A battery discharge device using a plurality of power modules for varying a discharge capacity of the device, and its method of use. The device can be used to discharge high-voltage, high-energy density battery packs such as might be used in hybrid or electric vehicles. The device can discharge the energy of the battery pack at a relatively constant power rate.

22 Claims, 4 Drawing Sheets

(56) References Cited

U.S. PATENT DOCUMENTS

| | | | |
|---|---|---|---|
| 7,714,541 B2* | 5/2010 | Stamos | H02J 7/0047 320/106 |
| 7,768,237 B2 | 8/2010 | Tarchinski | |
| 7,839,026 B2* | 11/2010 | Huang | H05K 9/0067 307/99 |
| 7,868,583 B2* | 1/2011 | Kim | H02J 7/0013 307/66 |
| 8,042,633 B2 | 10/2011 | Nakanishi | |
| 8,121,802 B2* | 2/2012 | Grider | B60L 15/2045 702/63 |
| 8,643,339 B2* | 2/2014 | Iwamura | H01M 2/34 320/136 |
| 9,428,058 B2* | 8/2016 | Namou | H01M 10/44 |
| 2002/0003417 A1* | 1/2002 | Bito | B60K 6/48 320/152 |
| 2005/0029990 A1 | 2/2005 | Tsukamoto et al. | |
| 2007/0273333 A1 | 11/2007 | Andruk et al. | |
| 2009/0237016 A1 | 9/2009 | Iwashita et al. | |
| 2010/0295550 A1* | 11/2010 | Hopper | B60L 11/1861 324/430 |
| 2011/0093148 A1 | 4/2011 | Kuehner et al. | |
| 2011/0127945 A1 | 6/2011 | Yoneda | |
| 2011/0133547 A1 | 6/2011 | Song et al. | |
| 2011/0221374 A1* | 9/2011 | Maebara | H02M 7/53871 318/494 |
| 2011/0267007 A1 | 11/2011 | Chen et al. | |
| 2011/0270480 A1 | 11/2011 | Ishibashi et al. | |
| 2012/0062029 A1* | 3/2012 | Fukuyama | B60L 3/0007 307/10.1 |
| 2012/0063044 A1* | 3/2012 | Fukuyama | B60L 3/00 361/62 |
| 2013/0106362 A1* | 5/2013 | Mackintosh | H01M 10/425 320/136 |
| 2014/0081490 A1* | 3/2014 | Adelman | B23P 23/04 701/22 |
| 2014/0132219 A1* | 5/2014 | Namou | H02J 7/00 320/127 |
| 2015/0162761 A1* | 6/2015 | Stanley | H02J 7/0029 318/139 |

OTHER PUBLICATIONS

2012 Bloomberg L.P., Bloomberg news article, http://www.bloomberg.com/news/print/2011-11-16/gm, entitled "GM Seeks Ways to Discharge Volt Batteries Following Car Crashes" by David Welch, Nov. 17, 2011.

* cited by examiner

PORTABLE ELECTRIC VEHICLE BATTERY DISCHARGER WITH PHYSICALLY REMOVABLE POWER DISCHARGE MODULES

BACKGROUND

This application relates generally to a device for discharging batteries, and more particularly this application relates to a constant-power high-voltage battery discharge device for discharging high-voltage and high-power-density battery packs for safe handling and/or maintenance and/or testing of large capacity batteries.

High energy battery packs are being used in many industries, and in particular in the automobile industry for hybrid and electric vehicles. These battery packs, which might include energy-dense lithium-ion battery cells, are arranged to provide relatively high voltages and store large amounts of energy.

In situations where the battery energy or battery voltage might be exposed to an individual, such as during automotive maintenance or accidents, it would be useful to deplete the battery prior to such maintenance or otherwise to protect persons and/or property from damage.

However, existing battery discharge devices aren't designed for such high voltage or high-energy situations. Furthermore, existing battery dischargers that are capable of higher voltages are generally very expensive and very large. Thus, a reasonably priced device that can discharge energy dense, high voltage battery packs in an efficient and useful manner is desirable.

SUMMARY

Provided are a plurality of example embodiments, including, but not limited to, a battery discharge device comprising a plurality of power discharge modules connected in parallel; and an interface configured to connect each one of the power discharge modules to an output of a battery pack. Each one of the power discharge modules is adapted to be connected to the battery pack such that, over a substantial output voltage range of the battery pack, each one of the power discharge modules consumes power at a substantially constant rate.

Also provided is a battery discharge device comprising a plurality of power discharge modules, each one of the power discharge modules including at least one resistor in series with at least one thermistor. The device also comprising an interface for connecting the plurality of discharge modules to a battery pack for discharging the battery pack. The power discharge modules are adapted to discharge the battery pack having a rated output of at least 100V.

Further provided is a method of discharging a battery pack of a vehicle using any of the above battery discharge devices.

Also provided is a method of discharging a battery pack of a vehicle comprising the steps of providing a battery discharge device separate from the vehicle, connecting the battery discharge device to the battery pack of the vehicle; discharging the battery pack of the vehicle using the battery discharge device until energy stored by the battery pack falls to a desired level; and disconnecting the battery discharge device from the vehicle.

Further provided is a method of discharging a battery pack of a vehicle, the method comprising the steps of providing a battery discharge device separate from the vehicle; connecting the battery discharge device to the battery pack of the vehicle; monitoring a charge state of the battery pack; discharging the battery pack of the vehicle using the battery discharge device by discharging the battery pack at a substantially constant rate of power for a substantial output voltage range of the battery pack; and disconnecting the battery discharge device from the vehicle when a charge of the battery pack has reached a desired threshold.

Also provided are additional example embodiments, some, but not all of which, are described hereinbelow in more detail.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF THE EXAMPLE EMBODIMENTS

A battery discharge device for discharging a battery pack is disclosed. In particular, the device can be utilized to discharge a high-energy density, high-voltage vehicle battery pack such as might be used in a hybrid or electric driven vehicle. This device can be used for battery packs with rated output voltages of 100V or more, having up to and even more than rated capacities of 170V with properly rated components. Thus, the device can be used with higher capacity batteries.

The device is used to safely dissipate (discharge) the stored energy in high-voltage battery packs (e.g., at rated outputs of 100V or more), such as those that might use energy dense lithium-ion batteries. In particular, such batteries may need to be at least partially discharged for repair purposes, or following damage to the vehicle and/or damage to the batteries, such as might occur in an accident situation. Furthermore, such batteries may need to be discharged if the automobile is to be junked or otherwise disposed of, or the battery pack alone or with the vehicle is to be transported for long distances. In some situations, it may be desirable to only partially discharge the batteries, in particular in situations where damage to the batteries should be avoided, such as where the batteries are to be recharged and reused in the future.

Figure 1:
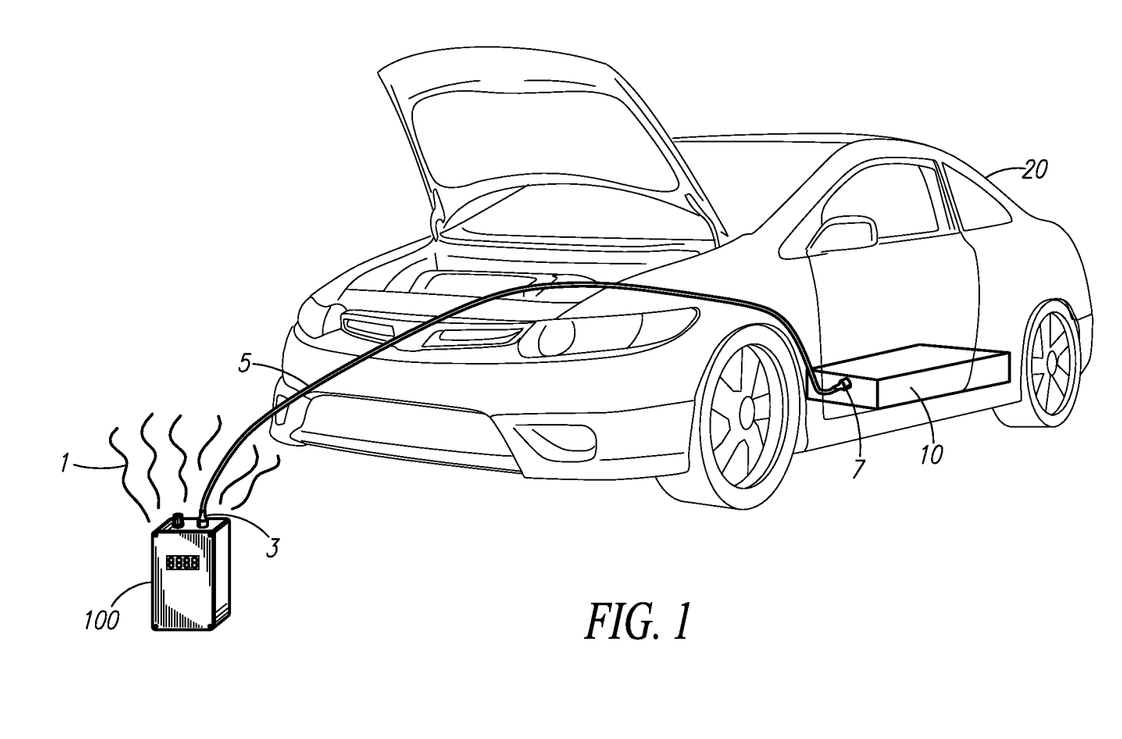
FIG. 1 is a drawing showing an example discharge device connected to a battery pack in a vehicle.

FIG. 1 shows a simplified block diagram of an example battery discharge device 100 put into use discharging the battery pack 10 of an automobile 20. The battery discharge device 100 is connected to the battery pack connector 3 via connection cable 5, which may be designed in a customized manner to connect to the particular electrical connection 7 provided on the battery pack 10. Of course, various automakers might standardize such connectors across models, or the connector might be chosen based on the battery pack 10 supply voltage, for example. Or such connectors may be unique to a given automobile model. Heat 1 is dissipated by the battery discharge device 100 during use.

Figure 2:
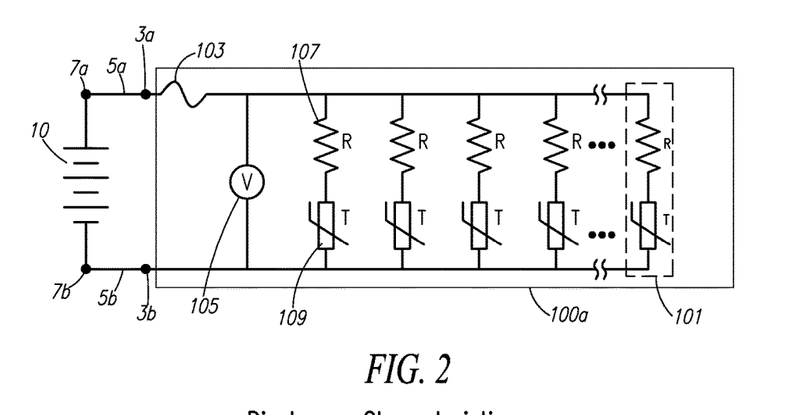
FIG. 2 is an electrical circuit schematic showing an example circuit that can be used to implement the example discharge device.

FIG. 2 is a schematic diagram 100a of an example implementation of the battery discharge device 100. This circuit 100a is comprised of a fuse 103 and a plurality of discharge groups 101 each comprised of a resistor 107 connected in series with a thermistor 109. Of course, multiple resistors could be used in parallel, in series, or in any combination of series/parallel to replace the resistor 107 shown in the FIG. 2 to support many different power capabilities, depending on the types of resistors that are economically available. Furthermore, the thermistor 109 could also be replaced with more than one thermistor in any desired parallel, series, or series/parallel arrangement as well.

Any number of such discharge groups 101 can be connected in parallel to increase the power discharge capability of the battery discharge device 100. Such discharge groups could also be connected in series to increase the rated voltage capability of the device as well. One or more of the discharge groups 101 can be provided as removable/installable modules for expanding or shrinking the capacity of the device, as desired.

The example implementation shows a fuse 103 to protect the device and the battery pack from overcurrents. An optional voltmeter 105 to show the currently detected battery voltage can be provided. This voltmeter can be used to provide an indication of the current charge state of the battery pack. The schematic of FIG. 2 shows the current path 5a, 5b through the connecting cable 5 from the battery 10 to the circuit 100a through the battery pack connector 7 via connections 7a, 7b, through the discharge circuit connector 3 via connections 3a, 3b.

For a practical example implementation of the circuit of FIG. 2, each discharge group includes a resistor R that is a 150 ohm wire-wound power resistor in series with a thermistor T that is a 39 ohm positive temperature coefficient (PTC) thermistor. For this example implementation, the minimum resistance of each grouping is about 189 ohms. Any practical number of such discharge groups can be placed in parallel, as desired, to adapt to desired power levels, but the practical number of such groups will depend on the speed with which it is desired to discharge the batteries (more groups in parallel mean faster discharge, fewer means longer discharge times), the heat removal capability of the device (more groups generate more heat), and the desired unit cost (clearly, more groups raise the cost)).

As an alternative, as suggested above, an example battery discharge device can be provided where the number of discharge groups is variable, such that at least some of the discharge groups are provided as removable discharge modules that can be added, or removed, as desired to adjust the power consumption capability of the device for particular applications. In such an example embodiment, the battery discharge device can be provided with sockets, with each socket being designed for receiving a corresponding discharge module, with the number of sockets being the desired maximum number of removable/addable battery discharge modules, such as for connecting as shown in the circuit FIG. 2. In some embodiments, some minimum number of the discharge modules can be hard-wired in the device, while sockets are provided so that other discharge modules are made removable, if desired. Alternatively, all such modules can be hardwired where flexibility is not desired. Additional discharge modules may also be selected by a switch, for example.

The components of the example discharge device 100 are powered off the battery pack 10, and thus no external power supply is necessary.

The resistance of each group will increase rapidly as heat builds up in the thermistor. This example configuration creates a nearly constant power output as the battery pack discharges, leading to a nearly constant discharge rate in an example application from approximately 170 volts (at battery full charge) down to about 30 volts (considered a safe discharge voltage). Each group acts as a nearly constant-power discharge device during this range. Different such ranges can also be accommodated by modifications to the device, or by using sufficiently rated components.

Hence, the discharge rate can be modified by adding or removing circuit groups, with more groups in parallel leading to quicker discharge, providing a flexible arrangement that can be used for various battery configurations. For example, any desired number of such discharge groups can be placed in parallel, but the practical number of such groups will depend on the speed with which it is desired to discharge the batteries (more groups in parallel mean faster discharge), the heat removal capability of the device (more groups generate more heat), and the desired unit cost (clearly, more groups raise the cost).

Figure 3:
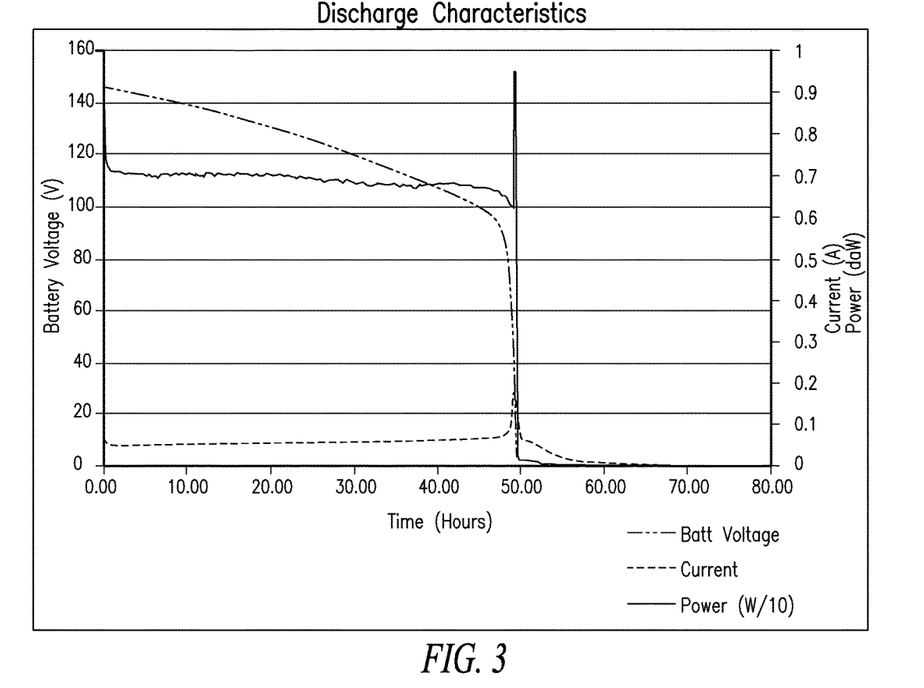
FIG. 3 is a plot of a power discharge characteristic of an example battery discharge device discharging an example battery pack.

In an example embodiment where six discharge groups are provided for discharging a lithium-ion battery pack that is rated at 170V and 676 Wh, the device is capable of discharging the battery pack at a rate of between 6~8 watts at a battery pack voltage between 170V (fully charge) and 60V (substantially discharged). A battery's charge level is referred to as "State of Charge (SoC)". With this example battery pack, a full SoC is approximately equal to 168V while a 0% SoC is equal to about 120V. This voltage range is where the battery operates efficiently and without damage. FIG. 3 shows an example discharge curve for such an application showing current, voltage, and power amounts during discharge of a battery partially charged to about 144V, where the power is nearly constant, being discharged at a rate between 6.5~7.2 W. At about the start of discharge, the power is dissipated at slightly above 7 W (at a battery voltage of about 144V), which drops to a discharge rate of just above 6.5 W after discharging for just under 50 hours (at a battery voltage of about 80V).

Once the battery voltage drops below 90V, the drop in voltage occurs much more rapidly, dropping to about 30V in just a few hours, although the power consumption is still basically steady until the voltage drops to between 20 and 40V, when the power discharge rate spikes up to between 9 W and 10 W, and then rapidly drops off to zero as the battery voltage continues to drop toward 0V. This power spike occurs because the effective resistance of each discharge group decreases. This is due to the lower cold thermistor resistance value (which is substantially lower than the hot thermistor resistance value), with the majority of the energy dissipation then occurring in the resistors. But as the voltage rapidly decreases, the power dissipation also rapidly drops to near zero near hour 50, due both to the higher power dissipation, and due to the more rapid voltage drop-off of the battery cells as they approach full discharge.

Note that lithium cells have a drop-off voltage where the chemical reaction ceases to create an effective potential, and any discharge below this point generally results in a non-reversible change in the cell that prevents it from taking a charge in the future. The thermistors are able to maintain the high resistance mode until the battery voltage drops to about 30 volts (750 mV per cell in this case), and thus the discharging operation should be stopped at near this point to avoid damaging the battery beyond recovery. Thus, fully discharging a battery pack to near zero is undesirable if the battery health is to be maintained, as it could lead to irreversible battery damage. However, if the battery is being discharged as part of a test or to mitigate safety concerns due to prior battery damage, a full discharge to zero volts may be desirable in those circumstances.

Figure 4:
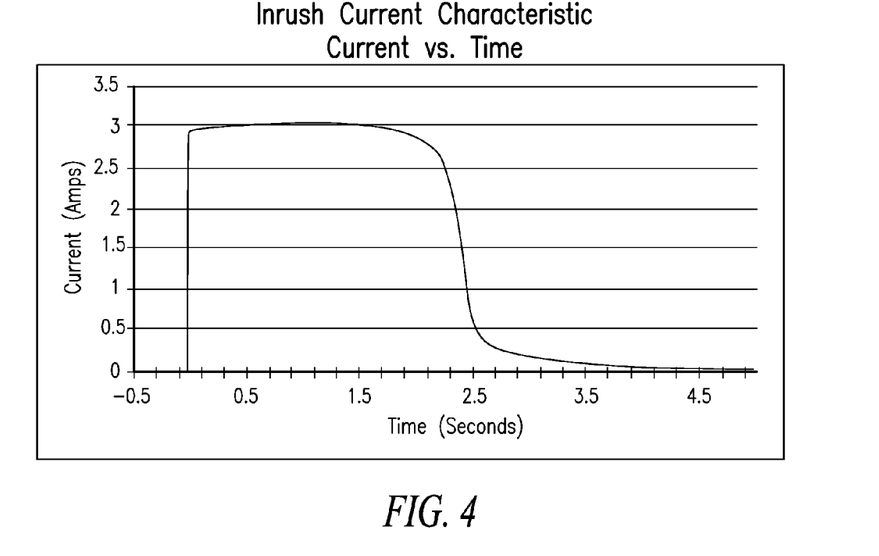
FIG. 4 is a plot showing an inrush current characteristic of the example power discharge device discharging the example battery pack.

FIG. 4 shows a plot of the inrush current vs. time in the example device, showing that as the thermistors 109 heat up, the large inrush current of about 3 amps drops within a few seconds to steady state.

For the example discharge scenario using six discharge groups for the example battery pack described above, a partially charged battery (charged to about 144V) can be adequately discharged in about 50 hours. Batteries more fully charged will take longer to discharge, while batteries that are less fully charged will take less time to discharge. As mentioned above, discharging below a certain threshold may be undesirable in some situations due to potential battery voltage (in the example case, this threshold is about 30V).

Hence, in the above examples, the output voltage range is between a rated voltage of the battery pack (e.g., about 170V) and less than 20% of the rated voltage (17.65% to the example of just about 30V) of the battery pack, during most of which the battery discharger can discharge the battery at a substantially constant rate of power consumption, that is a rate that varies by less than about 20% from a maximum steady state power consumption rate (ranging from about 6 W to about 7.5 W in the example), but that can be as tight as about 10% in the tested range shown FIG. 3. The example of FIG. 3 shows a steady-state power consumption of the example battery being discharged from about 144V to about 90V that is about ±5% of the mean power consumption (≅6.85 W). Thus, the power consumption variation is typically less than ±5% in the example voltage range of 144V to 90V for the example battery pack (which works to about a 60~50% SoC to less than a 0% SoC). Generally, the steady-state operation of such a discharger would be utilized at least between the 100% to 0% SoC range of a lithium-ion battery, or lower.

Figure 5:
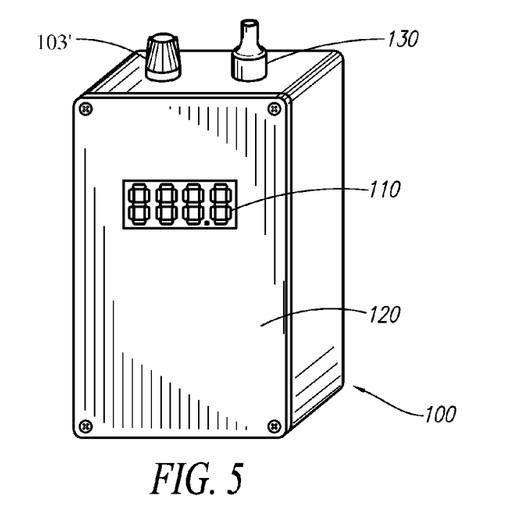
FIG. 5 is a drawing of one example embodiment of a power discharge device in a practical package.

FIG. 5 shows the example battery discharge device 100 provided in a case or enclosure 120 that is a 120 mm×200 mm×76 mm plastic project box. A Murata Datel DMS-20PC-8-DCM-C 4-digit volt meter 110 with a range of +30.0V to +199.9V is mounted in the front of the enclosure 120. A standard IEC 60320-Cl4 power receptacle 130 is provided for connecting to the custom power cord for connecting to the battery pack (not shown) and a fuse holder 103'. A switch for connecting and disconnecting the device from the battery can be provided, if desired (not shown).

The battery discharge device has several purposes, including: (1) The device can be used to reduce the state of charge (SoC) of a damaged or defective hybrid-electric vehicle battery (or one of a damaged vehicle) to limit the destructive potential of the battery or to repair or dispose of the vehicle; (2) the device can be used to reduce the state of charge (SoC) of a battery to meet SoC regulations for countries or other locales where laws prevent transportation or storage of high-energy batteries; and (3) the device can be employed as a loading device in battery discharge testing to evaluate the health and capacity of a battery pack.

Some of the advantages of the example embodiments are that the device is small, inexpensive, transportable, can handle high voltages and high energy densities, and requires no secondary power source. Additionally, it discharges in a nearly linear fashion (e.g., nearly constant power). For example, if the device is set for about a 10 Watt discharge rate, this discharge rate will remain approximately 10 Watts for most of the duration of the SoC reduction, regardless of battery voltage, except for the start (due to inrush), and near the end of the discharge (due to rapid battery voltage drop and thermistor action, as discussed above).

In operation, the device of the chosen configuration (having the desired number of discharge groups—6 groups in the example) is connected to the battery such as in FIG. 1, using an appropriate connecting cable 5 with a connector for connecting to the battery pack connector 7. The cable 5 is then connected to the battery discharge device 100 at connector 3 (in the example embodiment, to connector 130), and the discharge device is left to remain for a number of hours to discharge the battery based on the SoC of the battery (in the example, likely between 29 and 73 hours, or more for a fully charged battery pack). Once the battery is sufficiently discharged to the desired amount (which can be determined by reading the voltmeter or by monitoring the number of hours that the battery pack is being discharged, or perhaps by an indication of battery charge state provided by the vehicle itself, or by an outside device), the battery discharge device is disconnected from the battery pack which has been properly discharged. The automobile can now be handled, as desired.

Additional modifications can be provided to adapt the battery discharge device to desired applications. For example, for high-power discharge, a fan or external heat sink could be utilized to handle larger power dissipations, or the resistors and thermistors might be mounted to a heat sink that is thermally connected to the housing or a radiator.

Figure 6:
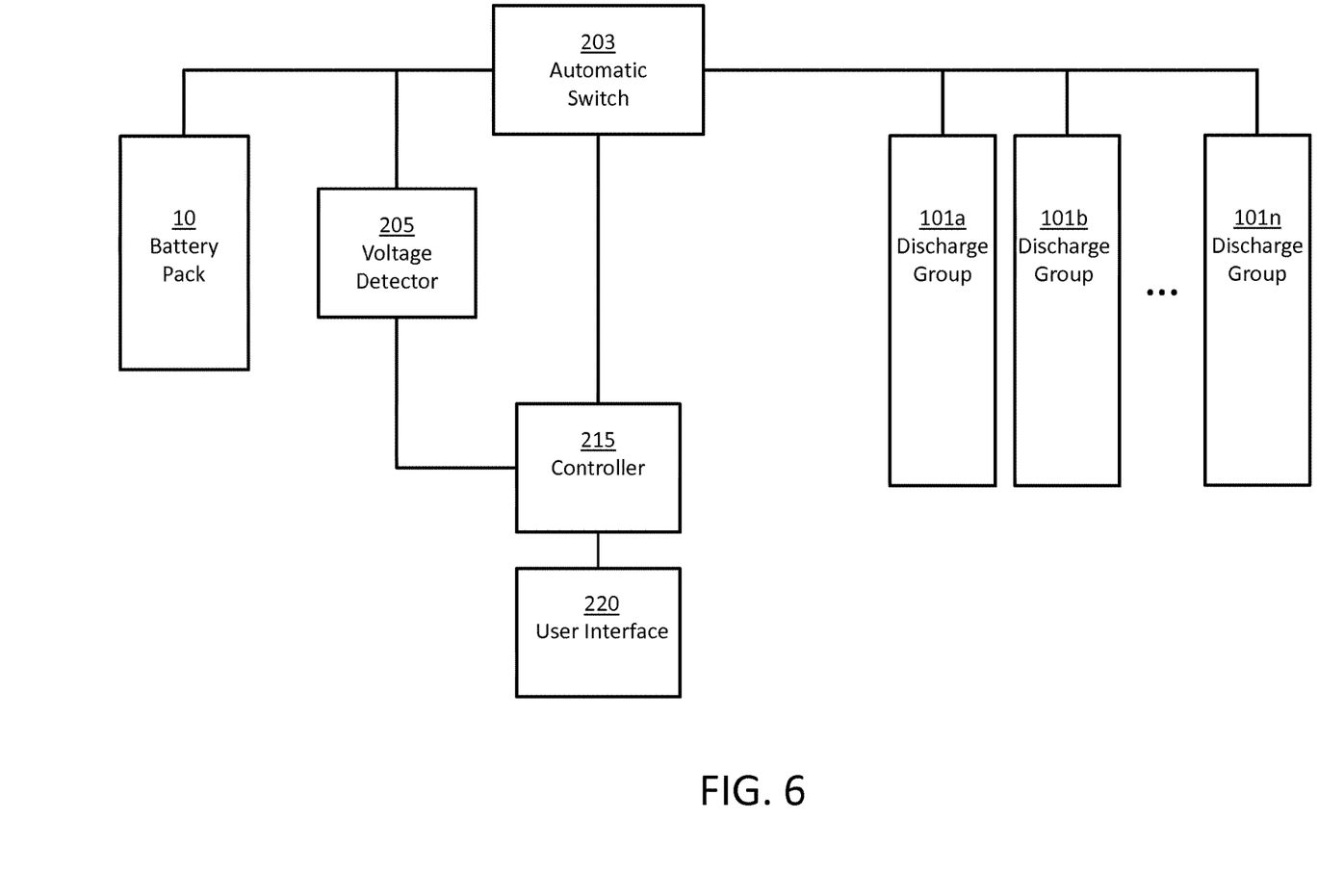
FIG. 6 is a block diagram of an alternative example discharge device.

Furthermore, a controlled switch could be inserted into the current path 5a of FIG. 2, such that the device could be automatically disconnected from the battery 10 when a desired discharge has been obtained. FIG. 6 is a block diagram showing an example of such an implementation. The battery pack 10 is connected to the discharge groups 101a, 101b, . . . 101n through an automatic switch device 203 that is controlled by a controller 215 based on a detected voltage of the battery pack 10 detected by a voltage detector 205. The controller 205 can be programmed (via software, firmware, or hard-wired logic) to trip the switch 203 at a desired battery pack voltage setting, which might be entered by a user via a user interface 220, for example. The user might set the desired discharged voltage of the battery pack 10, or a desired SoC. This way, the discharge operation can be automatically stopped when the desired discharge has occurred.

Finally, the battery discharge device can be made sufficiently compact and cost-effective such that the device could be integrated in a vehicle, when desired. However, mobile applications are also possible, such that the device might be provided with a handle and wheels for ease of movement, or otherwise provided in a mobile manner such that the device could be loaded on a vehicle to be transported by emergency personnel, or otherwise transported to the location of the automobile that is to be discharged. Furthermore, the device can be adapted for use by repair facilities, vehicle manufacturing facilities, or emergency personnel, for example.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A battery discharge device separate from a vehicle, comprising:
   a plurality of power discharge modules connected in parallel, wherein at least one of the plurality of power discharge modules is configured to be physically removable, and wherein the at least one physically removable power discharge module is connected to the battery discharge device via a socket, and wherein the at least one physically removable power discharge module is configured to be removably added to the battery discharge device in parallel with others of the power discharge modules for increasing a power consumption of the battery discharge device for more quickly discharging the battery pack or to be removably subtracted from the battery discharge device for decreasing the power consumption of the battery discharge device for more slowly discharging the battery pack; and
   an interface configured to connect an input of each one of the power discharge modules to an output of a battery pack, wherein each one of the power discharge modules is adapted to be connected to the battery pack such that, over an output voltage range of the battery pack, each one of the power discharge modules consumes power at an equally divided consumption rate.

2. The battery discharge device of claim 1, wherein the device is adapted for discharging a battery from a 100% state of charge (SoC) to at least a 0% SoC at the equally divided consumption rate that varies by less than about 20% from a maximum steady state power consumption rate.

3. The battery discharge device of claim 1, wherein each one of the power discharge modules comprises at least one resistor in series with at least one thermistor.

4. The battery discharge device of claim 3, further comprising a voltmeter configured to measure a voltage of the battery pack and a fuse configured to protect the device from damage.

5. The battery discharge device of claim 1, wherein the output voltage range of the battery pack is between about 170V and about 90V.

6. The battery discharge device of claim 5, wherein the equally divided consumption rate is a power consumption rate between about 7.5 W and about 6 W.

7. The battery discharge device of claim 1, wherein the equally divided consumption rate is a power consumption rate between about 7.5 W and about 6 W.

8. The battery discharge device of claim 1, wherein the power discharge modules are adapted to discharge the battery pack having a rated output voltage of at least 100V.

9. The battery discharge device of claim 1, wherein each one of the power discharge modules is adapted such that, over the output voltage range of the battery pack, and wherein the equally divided consumption is a steady-state rate that varies less than about ±5% of its mean value.

10. A method of discharging a battery pack of a vehicle using the battery discharge device of claim 1, the method comprising:
    providing the battery discharge device separate from the vehicle;
    connecting the battery discharge device to the battery pack of the vehicle;
    discharging the battery pack of the vehicle using the battery discharge device until energy stored by the battery pack falls to a desired level; and
    disconnecting the battery discharge device from the vehicle.

11. The battery discharge device of claim 1, wherein adjusting a number of the plurality of power discharge modules using the at least one physically removable power discharge module modifies at least one of the following:
    a capacity of the battery discharge device;
    a power level of the battery discharge device;
    a discharge speed of the battery discharge device;
    a heat removal capability of the battery discharge device; or
    a cost battery discharge device.

12. The battery discharge device of claim 1, wherein the socket is one of a plurality of sockets configured to receive a respective one of the power discharge modules, wherein a number of sockets corresponds to a maximum number of physically removable power discharge modules.

13. The battery discharge device of claim 12, wherein a first number of the power discharge modules are hard-wired in the battery discharge device and a second number of the power discharge modules are connected to the battery discharge device using the plurality of sockets.

14. A battery discharge device for and separate from a vehicle, comprising:
    a plurality of power discharge modules connected in parallel, each one of the power discharge modules including at least one resistor in series with at least one thermistor, wherein at least one of the plurality of power discharge modules is configured to be physically removable, and wherein the at least one physically removable power discharge module is connected to the battery discharge device via a socket, and wherein the at least one physically removable power discharge module is configured to be removably added to the battery discharge device in parallel with others of the power discharge modules for increasing a power consumption of the battery discharge device for more quickly discharging the battery pack or to be removably subtracted from the battery discharge device for decreasing the power consumption of the battery discharge device for more slowly discharging the battery pack; and
    an interface configured to connect the plurality of discharge modules to a battery pack for discharging the battery pack, wherein the power discharge modules are adapted to discharge the battery pack having a rated output of at least 100V.

15. The battery discharge device of claim 14, wherein each one of the power discharge modules is adapted such that, over an output voltage range of the battery pack, the device consumes power at an equally divided steady-state rate that varies less than about ±5% of the mean value.

16. The battery discharge device of claim 14, further comprising a voltmeter configured to measure a voltage of the battery pack and a fuse configured to protect the device from damage.

17. The battery discharge device of claim 14, wherein the plurality of power discharge modules are connected in parallel such that each one of the plurality of power discharge modules, over an output voltage range of the battery pack, consumes power at an equally divided steady-state rate.

18. The battery discharge device of claim 17, the at least one physically removable power discharge module is configured to be removably added to the battery discharge device in parallel with others of the power discharge modules for increasing a power consumption of the battery discharge device for more quickly discharging the battery pack.

19. The battery discharge deice of claim 14, wherein the battery discharge device is configured to be separate from the vehicle.

20. A method of discharging a battery pack of a vehicle, the method comprising:
providing a battery discharge device separate from the vehicle, the battery discharge device comprises a plurality of power modules connected in parallel with at least one of the plurality of power modules configured to be physically removable wherein the at least one physically removable power discharge module is connected to the battery discharge device via a socket;
connecting the battery discharge device to the battery pack of the vehicle;
monitoring a charge state of the battery pack;
discharging the battery pack of the vehicle using the battery discharge device by discharging the battery pack at an equally divided consumption rate of power for an output voltage range of the battery pack; and
disconnecting the battery discharge device from the vehicle when a charge of the battery pack has reached a desired threshold.

21. The method of claim 20, wherein the charge state of the battery pack is monitored by monitoring an output voltage of the battery pack.

22. The method of claim 20, wherein the plurality of power modules each includes at least one resistor in series with at least one thermistor.

* * * * *